United States Patent [19]
Koizumi

[11] Patent Number: 5,340,458
[45] Date of Patent: Aug. 23, 1994

[54] ELECTROLYTIC ION WATER GENERATOR

[75] Inventor: Haruhiko Koizumi, Chigasaki, Japan

[73] Assignee: Toho Technical Service Co., Ltd., Kanagawa, Japan

[21] Appl. No.: 104,798

[22] Filed: Aug. 11, 1993

[30] Foreign Application Priority Data

Dec. 8, 1992 [JP] Japan .................. 4-351679

[51] Int. Cl.$^5$ .......................................... C02F 1/461
[52] U.S. Cl. ...................... 204/253; 204/257; 204/267; 204/269; 204/275; 204/301
[58] Field of Search ............. 204/253, 257, 301, 275, 204/269, 267

[56] References Cited

U.S. PATENT DOCUMENTS

| | | | |
|---|---|---|---|
| 4,758,322 | 7/1988 | Sioli | 204/255 |
| 4,784,741 | 11/1988 | Boulton et al. | 204/242 |
| 4,800,008 | 1/1989 | Detournay et al. | 204/253 |
| 4,863,593 | 9/1989 | O'Callaghan et al. | 210/230 |

*Primary Examiner*—John Niebling
*Assistant Examiner*—Arun S. Phasge
*Attorney, Agent, or Firm*—Flynn, Thiel, Boutell & Tanis

[57] ABSTRACT

This invention relates to an electrolytic ion water generator for producing alkali ion water containing alkali ions and acid ion water containing acid ions by introducing tap water or the like into an electrolytic cell comprising electrodes and ion exchange membranes arranged alternately which electrolyze the electrolytes in the water.

Electrolytic cell unit panels having the same shape are constructed by attaching the electrode plate and ion exchange membrane onto each synthetic resin frame. The electrolytic cell unit panels are layered in a water-tight manner facing the front sides to front sides and the rear sides to rear sides via O-rings. A water-inlet external cover is attached at one end of the layered electrolytic cell unit panels, and a water-outlet external cover is attached at the other end of the layered electrolytic cell unit panels in a water-tight manner to secure the total assembly.

Since the electrolytic ion water generator of this invention can be assembled just by layering electrolytic cell unit panels of the same shape, the assembly process is simplified and the whole device is compact. By adjusting the number of layered electrolytic cell unit panels, it is simple to manufacture a generator having the required ion water production capacity.

When the flow-path switching mechanism which is actuated in response to the change of polarity of the electrode plate is installed within a separate panel inserted in the water-outlet external cover or between the water-outlet external cover and the electrolytic cell unit panel, the scale deposited on the cathode plate during operation can be removed without interrupting the generation of ion water.

6 Claims, 4 Drawing Sheets

ELECTROLYTIC ION WATER GENERATOR

FIELD OF THE INVENTION

This invention relates to an improvement in an electrolytic ion water generator which produces both alkali ion water and acid ion water by electrolyzing water such as tap water.

More particularly, this invention relates to an electrolytic ion water generator which is easily assembled by layering electrolytic cell unit panels having the same shape into a compact unit.

BACKGROUND OF THE INVENTION

Since most food consumed by humans in everyday life is acidic, the human body tends to become alkali-deficient. To cope with the imbalance, water containing alkali ions such as calcium, sodium, magnesium and potassium is commercially available as household drinking water to maintain health by replenishing alkali and mineral components.

Household and industrial devices which generate electrolytic ion water containing these alkali ions by electrolyzing city water have gradually become popular. Such an electrolytic ion water generator comprises a pair of electrodes placed apart from each other to form an anode and cathode, and an electrolytic cell having an ion exchange membrane separating these electrodes to form an anode chamber and cathode chamber. The electrolytic ion water generator is connected to a tap water faucet to introduce the water thereto, electrolyses the electrolytes in the water at the electrolytic cell, and removes the water containing alkali ions (cation) from the cathode chamber and the water containing acid ions (anion) from the anode chamber. Plate-type electrodes are usually used for the electrodes, and a number of electrolytic cells are arranged vertically.

The electrolytic ion water generator having the structure described above is assembled from a number of electrolytic cells comprising electrode plates and ion exchange membranes which are arranged alternately at a fixed distance from each other to form a water-tight structure. This configuration has certain disadvantages such as a large number of assembly steps, difficult assembly procedure, low construction efficiency, higher production cost, and long disassembly time when replacing parts.

In addition, electrolytic ion water generators tend to deposit scale such as alkali hydrate on the cathode during operation, which degrades the electrolytic efficiency. Consequently, the polarity of the electrodes must be changed periodically to clean them by back-washing. To prevent any interruption of ion water generation during the cleaning period, a means of switching the electrodes and a means of switching the water flow-path are proposed. These means make it possible to generate ion water even while cleaning the electrolytic cell. However, installing such a water flow-path switching means into a conventional ion water generator inevitably enlarges the device because the structure comprising piping to switch the water flow-path and the water flow-path switching valve cannot easily be compactly built into the cell container.

SUMMARY OF THE INVENTION

This invention has been developed to solve the above mentioned problems of electrolytic ion water generators.

It is an object of this invention to provide an electrolytic ion water generator which is easily assembled and which is compact.

It is a further object of this invention to provide an electrolytic ion water generator which can be assembled with a variable number of electrolytic cells to meet the required capacity of ion water production.

It is a further object of this invention to provide an electrolytic ion water generator which enables the electrolytic cell to be cleaned without interrupting the generation of ion water by installing a compact electrolytic cell cleaning unit having a means to switch the water flow-path.

One fundamental aspect of this invention is that the electrolytic ion water generator is constructed with electrolytic cell unit panels, each of which is structured by placing an electrode plate within a synthetic resin frame and by sandwiching the electrode plate with ion exchange membranes on both sides thereof, and is assembled by layering these electrolytic cell unit panels in a water-tight manner while facing the front sides to front sides and the rear sides to rear sides via an O-ring. A water-inlet external cover is attached to the water-inlet opening on one side of the layered electrolytic cell unit panels, and a water-outlet external cover is attached to the alkali ion water-outlet opening and the acid ion water-outlet opening to produce a water-tight unit. This configuration makes the assembly process extremely simple, reduces the production cost, and makes the device compact. Furthermore, the production capacity of electrolytic ion water can be freely changed by adjusting the number of layered electrolytic cell unit panels, which makes it easy to assemble an electrolytic ion water generator having the required capacity by increasing or decreasing the number of layered panels.

Another fundamental aspect of this invention is that a water flow-path switching valve, which is actuated in response to changes of polarity of electrode plates, and piping to switch the water flow-path, both of which are necessary to clean the electrolytic cell, can be located within the water-outlet external cover or within a separate panel placed between the water-outlet external cover and the electrolytic cell unit panel adjacent to the water-outlet external cover, which keeps the device compact and simple to assemble.

The preferred electrode plates used in the electrolytic cell of this invention are made from metallic plates such as stainless steel plate and titanium plate, and particularly preferred are titanium plates coated with noble metals such as platinum by plating or baking. With any kind of material for the electrodes, it is preferable to prepare the electrodes for both anode electrolytic cells and cathode electrolytic cells with the same kind of material for durability, lifespan and simplification of assembly. At the top of each electrode plate, an electrode terminal made of the same material as the electrode is attached by spot welding.

The synthetic resin frame forming the electrolytic cell unit panel is formed by integrated molding, burying both side edges of the electrode plate and the intermediate portion of the electrode terminal, and exposing both the front and rear faces of the electrode inside the frame. The ion exchange membranes are set to both the front and rear faces of the synthetic resin frame so as to sandwich the electrode plate. By connecting the electrode plate with the anode or cathode, the electrolytic cell unit panel comprising the synthetic resin frame forms an anode electrolytic cell unit or cathode electrolytic cell unit, respectively, each having the same shape. The synthetic resin frames forming the electrolytic cell unit panel are layered in a water-tight manner while facing the front sides to front sides and the rear sides to rear sides via an O-ring. On one side of the layered electrolytic cell unit panels, a water-inlet external cover is attached, and a water-outlet external cover is attached on the other side. This is the structure of the electrolytic ion water generator of this invention.

To remove the scale deposited on the cathode during operation of the electrolytic ion water generator of this invention while enabling the electrolytic cell to be cleaned without interrupting the generation of ion water, the generator contains a means of switching the flow-path comprising a switching valve and piping to switch the ion water flow-path, which enables alkali ion water to be discharged from the alkali ion water-outlet opening and acid ion water to be discharged from the acid ion water-outlet opening, even during the period of cleaning the electrolytic cell following the change of polarity. The switching means is installed within the water-outlet external cover or within a separate panel inserted between the water-outlet external cover and the electrolytic cell unit panel. It is actuated in response to a change of polarity, and switches the flow-path of each ion such that the flow-path connected to the alkali ion water-outlet opening is opened to the flow-path where acid ion water flowed before the switching; the flow-path connected to the acid ion water-outlet opening is opened to the flow-path where alkali ion water flowed before the switching.

DETAILED DESCRIPTION OF THE PREFERRED EMBODIMENT

Figure 1:
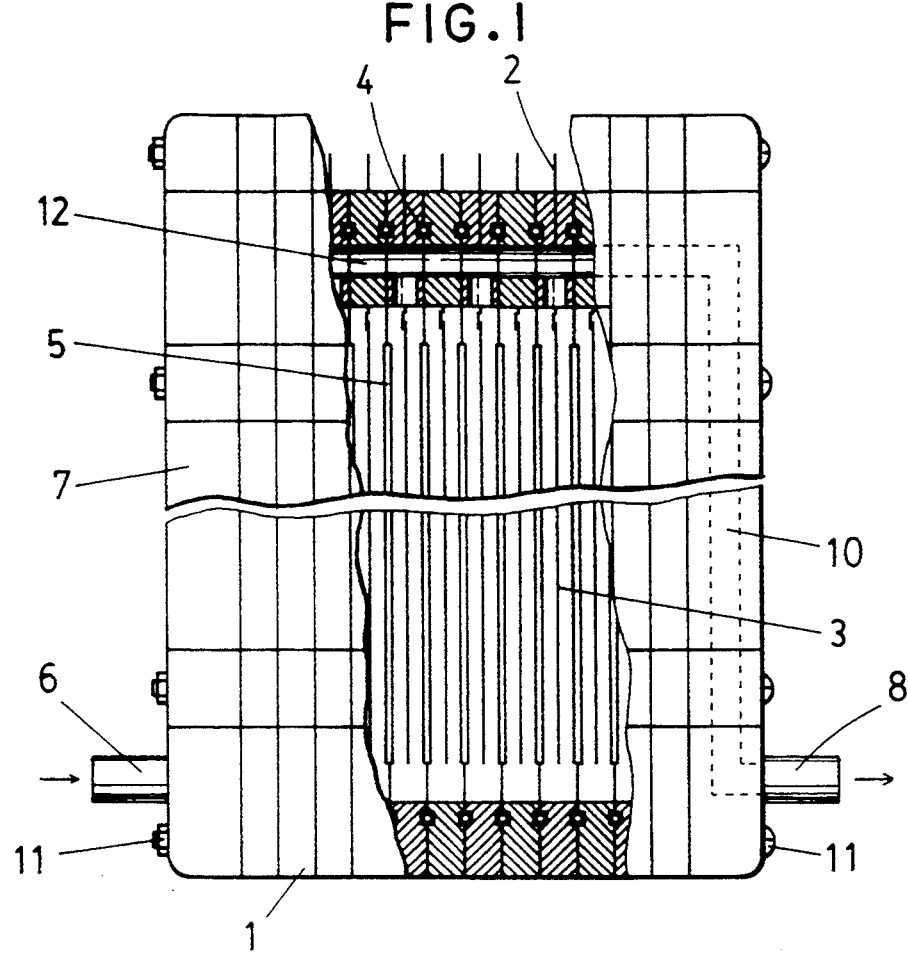
FIG. 1 is a part sectional side view of a portion of the electrolytic ion water generator of this invention.

This invention is further described in detail using embodiments referring to the drawings.

Figure 2:
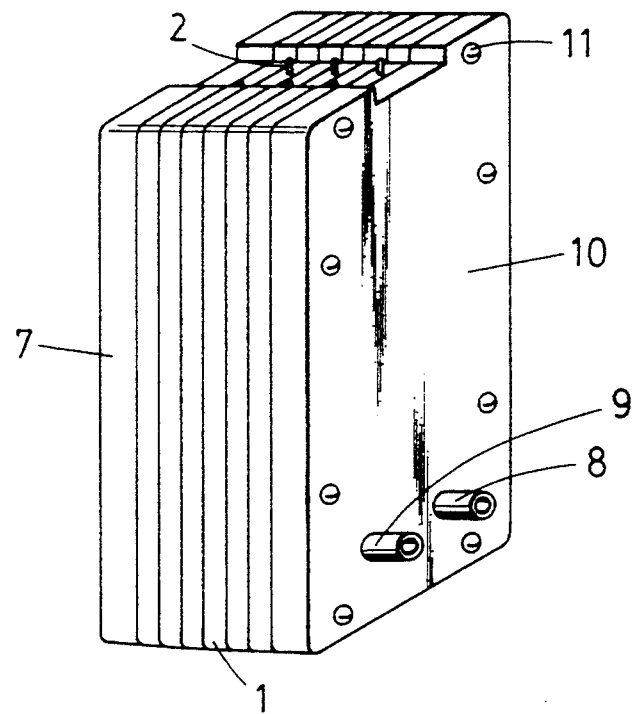
FIG. 2 is a perspective view showing the electrolytic ion water generator of this invention.

In FIG. 1 and FIG. 2, which illustrate the electrolytic ion water generator of this invention, electrolytic unit panel 1 is made of a synthetic resin frame formed by integrated molding with electrode plate 3 having electrode terminal 2 projecting from the top of facility 1. The electrolytic cell unit panels 1 having ion exchange membranes 5 with a space from electrode plate 3 are layered in a water-tight manner via O-rings 4, facing the front sides to front sides and rear sides to rear sides. At both ends of the layered electrolytic cell unit panels, a water-inlet external cover 7 having a water-inlet opening 6 is set at one end via an O-ring, and a water-outlet external cover 10 having an alkali ion water-outlet opening 8 and an acid ion water-outlet opening 9 is set at the other end via an O-ring a water-tight manner. All the layered panels are secured water-tightly using metal fixtures 11 such as nuts and bolts. Electrode terminals 2 of the electrode plates 3 are connected with the anodes and cathodes alternately to form the anode electrolytic cell and the cathode electrolytic cell, respectively. The reference character of 12 is the discharge hole of generated ion water, and the discharge hole is connected to the alternately arranged opening to the inside of the cathode electrolytic cell and with the alkali ion water-outlet 8. Another ion water discharge hole is positioned parallel to discharge hole 12, and the ion water discharge hole is connected to the alternately arranged opening to the inside of the anode electrolytic cell and with the acid ion water-outlet opening 9.

Figure 3:
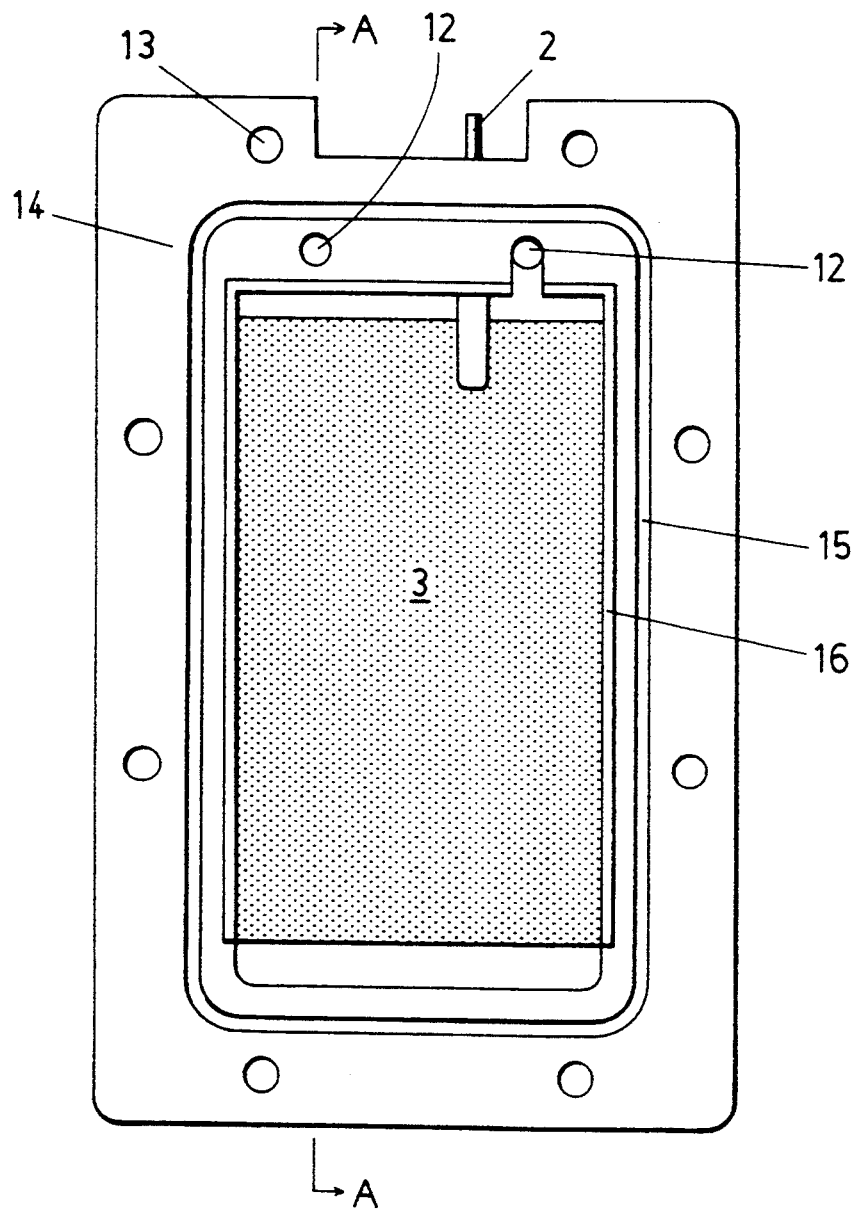
FIG. 3 is the front view of the electrolytic unit panel.
Figure 4:
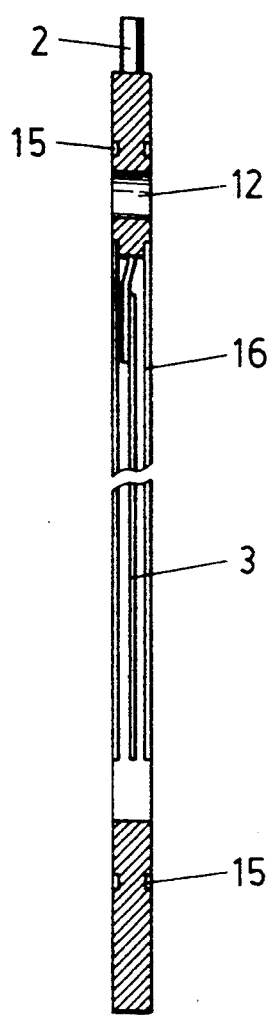
FIG. 4 is the section A—A in FIG. 3.

FIG. 3 and FIG. 4 show an example of the electrolytic cell unit panel structure. As seen in these figures, the electrolytic cell unit panel 1 comprises a synthetic resin frame 14 in a picture frame shape. At specified positions on the periphery of frame 14, multiple holes 13 are located to accept the metal fixtures 11 to fasten the layered frames. On both the front and rear faces of frame 14, a groove 15 for the O-ring and a recessed face zone 16 to set the ion exchange membrane 5 are provided. Between the groove 15 for the O-ring and the recessed face zone 16, a pair of water flow holes 12 penetrate the frame 14 at the upper portion thereof. One of the two water flow holes 12 opens to the inside space of the electrolytic cell of the electrolytic cell unit panel, the space being formed by the frame 14 shown in FIG. 3 and FIG. 4, while the other water stream hole does not open to the inside of the electrolytic cell. The intermediate portion of the electrode terminal 2 of the electrode plate 3 is buried in the frame 14, and both side edges of the electrode plate 3 are also buried in the frame. The electrode plate 3 is mounted to the frame 14 in a manner to expose the front and rear faces inside the frame 14. The electrode plate 3 and the electrode terminal 2 are assembled in the frame 14 by integrated molding by burying the electrode plate 3 when forming the synthetic resin frame 14.

The synthetic resin frame 14 forming the electrolytic cell unit panel 1 is a thin plate which has the same shape on both its front and rear sides, which fits each of the grooves 15 for the O-ring, recessed face zone 16, water flow holes 12, and holes 13 when the panels are mated facing the panels front to front and rear to rear. Many electrolytic cell unit panels 1 prepared and layer facing front to front and rear to rear in a water-tight manner to secure, a compact electrolytic ion water generator as shown in FIG. 2. To operate the generator, the electrode terminals of the layered electrolytic cell unit panels are connected to the anode and cathode alternately to make an alternate arrangement of anode electrolytic cells and cathode electrolytic cells.

If the flow-path switching means is formed within the water-outlet external cover 10 or in a separate panel inserted between the water-outlet external cover 10 and the electrolytic cell unit panel 1, then two bypass lines 17 are installed to connect the flow-path between the water flow-path hole 12 and the acid ion water-outlet opening 9 of the anode electrolytic cell with the flow-path between the water flow hole 12 and the alkali ion water-outlet opening 8 of the cathode electrolytic cell. A pair of flow-path switching valves means 18 which are actuated in response to change of polarity are installed at suitable positions in the bypasses 17. The flow-path switching valve means 18 preferably has an electromagnetic valve mechanism in which a flow-path switching ball valve made of a permanent magnet is located in the space covering both the flow-path and the bypass. The permanent magnet ball valve is moved left and right by actuating the electromagnet in response to change of polarity in order to open or close the flow-path or bypass 17.

Figure 6:
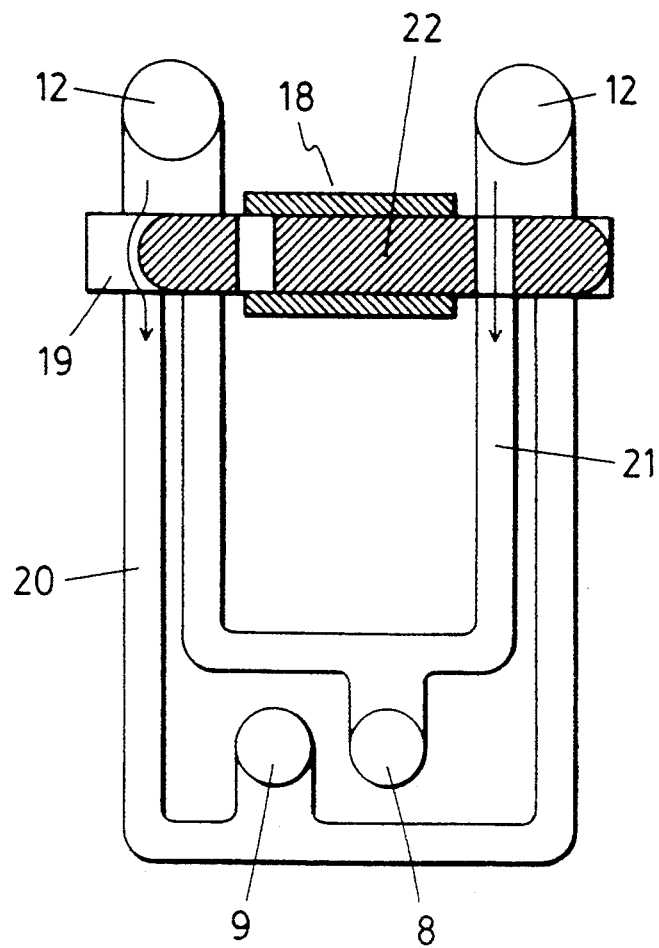
FIG. 6 is an illustrative drawing of another embodiment of the means of switching the flow-pass.

FIG. 6 shows an embodiment of another flow-path switching mechanism. Downward extending portions starting from the water flow hole 12 of the anode electrolytic cell and the water flow hole 12 of the cathode electrolytic cell are provided. A lateral space 19 connecting these extended parts is thus formed. At the opposite side from the water flow hole in the space 19, a flow-path 21 which connects with the space 19 and opens to the alkali ion water-outlet opening 8 and a flow-path 20 which opens to the acid ion water-outlet opening 9 are formed parallel to each other. A flow-path switching valve means 18 which is actuated in response to change of polarity is mounted in the space 19. The flow-path switching valve means 18 preferably consists of a solenoid electromagnetic valve. The cylinder 22 for flow-path switching is inserted into the space 19 and has a hole or groove at a specified position to guide the ion water.

To operate the electrolytic ion water generator of this invention, the electrode terminals 2 of the layered electrolytic cell unit panels 1 are alternately connected to the anode and cathode to make an alternate arrangement of anode electrolytic cells and cathode electrolytic cells. Tap water is introduced from the water-inlet opening 6, and is subjected to electrolytic dissociation of its electrolytes as the water ascends through each of the electrolytic cells, and alkali ions such as sodium ions, calcium ions, potassium ions and magnesium ions migrate to the cathode electrolytic cells through the ion exchange membrane 5, and then enter the water flow hole 12 which opens to the cathode electrolytic cell. Meanwhile, acid ions such as chlorine ions and sulfate ions migrate to the anode electrolytic cell and enter the water flow hole 12 which opens to the anode electrolytic cell. In this way, the alkali ion water containing alkali ions is continuously discharged from the alkali ion water-outlet opening 8, and the acid ion water containing acid ions is continuously discharged from the acid ion water-outlet opening 9.

Figure 5:
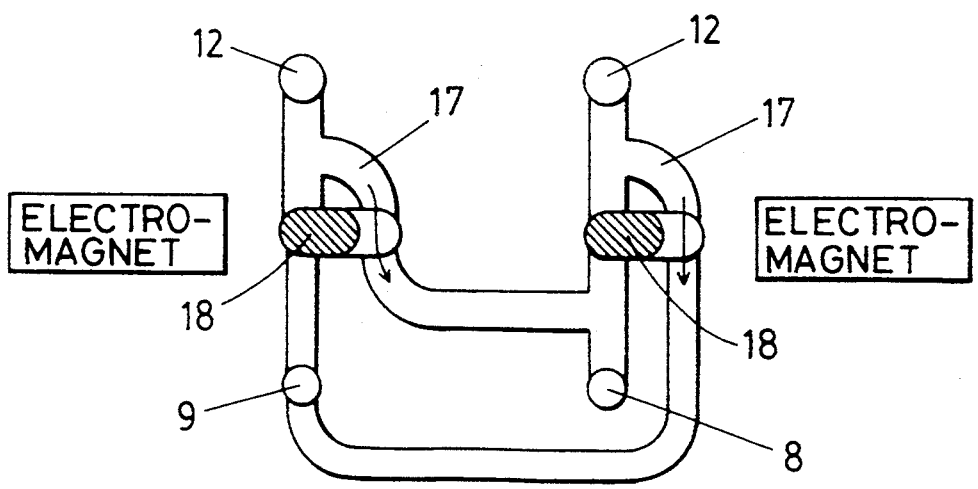
FIG. 5 is an illustration of an embodiment of the means of switching the flow-pass.

By preparing the flow-path switching mechanism as shown in FIG. 5 or FIG. 6 within the water-outlet external cover 10 or within the synthetic resin panel inserted between the water-outlet external cover 10 and the electrolytic cell unit panel 1, ion water is continuously generated; the alkali ion water is discharged continuously from the alkali ion water-outlet opening 8, while the acid ion water is discharged continuously from the acid ion water-outlet opening 9, even during electrolytic cell cleaning while changing the polarity of the electrode plates to remove scale from the cathode surface. The deposited scale can thus be removed from the electrodes which act as the cathode during operation of the ion water generator or at the beginning or end of every cycle of operation by changing the polarity, which approximately doubles the life of electrodes.

While the invention has been described in detail and with reference to specific embodiments thereof, it will be apparent to one skilled in the art that various changes and modifications can be made therein without departing from the scope of the claims.

What is claimed is

1. An electrolytic ion water generator for generating both alkali ion water containing alkali ions and acid ion water containing acid ions by introducing water into an electrolytic cell comprising electrodes and ion exchange membranes arranged alternately to electrolyze the electrolytes contained in the water, said electrolytic ion water generator comprising layered electrolytic cell unit panels, a water-inlet external cover located on one side of the layered electrolytic cell unit panels, and a water-outlet external cover located on the other side thereof, an electrolytic cell unit panel comprising a synthetic resin frame, an electrode plate, and an ion exchange membrane, and the synthetic resin frame having holes at specified points on its periphery thereof to accept metal fixtures to fasten the layered frames, a groove for O-rings at the inner periphery of the row of holes, a recessed face zone on each front side and rear side of the frame for the ion exchange membrane, and two water flow holes across the frame at the specified points between the groove for the O-rings and the recessed face zone, one of the water flow holes opening to the inside of the electrolytic cell, the electrode plate being located in the electrolytic cell unit panel within the thickness of the synthetic resin frame and provided with an electrode terminal at the top thereof which projects from the synthetic resin frame, the ion exchange membranes being set into the recessed face zones formed on both the front and rear sides of the synthetic resin frame and arranged so that they face the electrode plates and sandwich them, while maintaining a distance therebetween, the water-inlet external cover being provided with a water inlet opening connected with the electrolytic cell formed by the electrolytic cell unit panels, the water-outlet external cover being provided with an alkali ion water-outlet opening connected with one of the two water flow holes for discharging the generated alkali ion water, an acid ion water-outlet opening connected with the other water flow hole to discharge the generated acid ion water, an electrolytic cell cleaning device comprising a pair of bypasses housed within the water-outlet external cover or within a separate panel installed between the water-outlet external cover and an adjacent electrolytic cell unit panel, the bypasses allowing water to flow between one of the two water flow holes and the alkali ion water-outlet opening and the other water flow hole and the acid ion water-outlet opening independently, and a flow-path switching valve, which is activated in response to changes of polarity, mounted in a flow-path connecting the alkali ion water-outlet opening and one of the bypasses, and a flow-path connecting the acid ion water-outlet opening and the other bypass, the electrolytic cell unit being assembled by layering the electrolytic cell unit panels in a water-tight manner while facing the front sides to front sides and the rear sides to rear sides via the O-rings fitted in the grooves for the O-rings on the electrolytic cell unit panels, attaching the water-inlet external cover and the water-outlet external cover in a water-tight manner, and fastening by passing metal fixtures through holes in the synthetic resin frame and tightening.

2. The electrolytic ion water generator of claim 1, wherein the electrolytic cell cleaning device is housed within a separate panel installed between the water-outlet external cover and the adjacent electrolytic cell unit, and the electrolytic cell unit is assembled by layering the electrolytic cell unit panels in a water-tight manner while facing the panels front sides to front sides and rear sides to the rear sides via the O-rings fitted in the grooves for the O-rings on the electrolytic cell unit panels, by connecting the water-inlet external cover, a separate panel and the water-outlet external cover in a water-tight manner, and by fastening by passing metal fixtures through the holes in the synthetic resin frame and tightening.

3. The electrolytic ion generator of claim 1, wherein the electrode plate is made of titanium coated with a noble metal.

4. An electrolytic ion water generator for generating both alkali ion water containing alkali ions and acid ion water containing acid ions by introducing water into an electrolytic cell comprising electrodes and ion exchange membranes arranged alternately to electrolyze the electrolytes contained in the water, said electrolytic ion water generator comprising layered electrolytic cell unit panels, a water-inlet external cover located on one side of the layered electrolytic cell unit panels, and a water-outlet external cover located on the other side thereof, an electrolytic cell unit panel comprising a synthetic resin frame, an electrode plate, and as ion exchange membrane, and the synthetic resin frame having holes at specified points on its periphery thereof to accept metal fixtures to fasten the layered frames, a groove for o-rings at the inner periphery of the row of holes, a recessed face zone on each front side and rear side of the frame for the ion exchange membrane, and two water flow holes across the frame at the specified points between the grooves for the O-rings and the recessed face zone, one of the water flow holes opening to the inside of the electrolytic cell, the electrode plate being located in the electrolytic cell unit panel within the thickness of the synthetic resin frame and provided with an electrode terminal at the top thereof which projects from the synthetic resin frame, the ion exchange membranes being set into the recessed face zones formed on both the front and rear sides of the synthetic resin frame and arranged so that they face the electrode plates and sandwich them, while maintaining a distance therebetween, the water-inlet external cover being provided with a water inlet opening connected with the electrolytic cell formed by the electrolytic cell unit panels, the water-outlet external cover being provided with an alkali ion water-outlet opening connected with one of the two water flow holes for discharging the generated alkali ion water, an acid ion water-outlet opening connected with the other water flow hole to discharge the generated acid ion water, an electrolytic cell cleaning device comprising a horizontally extended space formed within the water-outlet external cover or within a separate panel installed between the water-outlet external cover and an adjacent electrolytic cell unit panel and connecting each of the two water flow holes or the extended portions thereof, flow-paths, which are opened to the alkali ion water-outlet opening and to the acid ion water-outlet opening, being formed side by side and adjacent to the space and opposite to the water flow hole in the space, a flow-path switching valve located within the space and mounted for reciprocating movement in a horizontal direction in response to changes of polarity such that when one of the two water flow holes opens to the alkali ion water-outlet opening, the valve connects the other water flow hole with the flow-path which is opened to the acid ion water-outlet opening, and when one of the two water flow holes opens to the acid ion water-outlet opening, the valve connects the other water flow hole with the flow-path which is opened to the alkali ion water-outlet opening, the electrolytic cell unit being assembled by layering the electrolytic cell unit panels in a water-tight manner while facing the front sides to front sides and the rear sides to rear sides via the O-rings fitted in the grooves for the O-rings on the electrolytic cell unit panels, attaching the water-inlet external cover and the water-outlet external cover in a water-tight manner, and fastening by passing metal fixtures through holes in the synthetic resin frame and tightening.

5. The electrolytic ion water generator of claim 4, wherein the electrolytic cell cleaning device in housed within a separate panel installed between the water-outlet external cover and the adjacent electrolytic cell unit panel, and the electrolytic cell unit is assembled by layering the electrolytic cell unit panels in a water-tight manner while facing the panels front sides to front sides and rear sides to rear sides via the O-ring fitted in the grooves for the O-rings on the electrolytic cell unit panels, by connecting the water-inlet external cover, a separate panel and the water-outlet external cover in a water-tight manner, and by fastening by passing metal fixture through the holes in the synthetic resin frame and tightening.

6. The electrolytic ion generator of claim 4, wherein the electrode plate is made of titanium coated with a noble metal.

* * * * *

UNITED STATES PATENT AND TRADEMARK OFFICE
CERTIFICATE OF CORRECTION

PATENT NO. : 5 340 458
DATED : August 23, 1994
INVENTOR(S) : Haruhiko Koizumi It is certified that error appears in the above-identified patent and that said Letters Patent is hereby corrected as shown below:

```
Column 7, line 22;   change "as" to ---an---.
Column 7, line 26;   change "o-rings" to ---O-rings---.
Column 7, line 30;   change "grooves" to ---groove---.
Column 8, line 32;   change "in" to ---is---.
```

Signed and Sealed this

Twenty-ninth Day of November, 1994

Attest:

BRUCE LEHMAN

Attesting Officer     Commissioner of Patents and Trademarks